United States Patent
Elgarhy

(10) Patent No.: US 8,298,674 B2
(45) Date of Patent: Oct. 30, 2012

(54) PROTECTING AGENT FOR CONCRETE, MASONRY SURFACE, BRICKS, CLAY ROOFING, TILES, MARBLE, GRANITE, CONCRETE SLATE, STUCCO, PAVING STONES, UNGLAZED CERAMIC, SANDSTONE, LIMESTONE, WOOD AND OTHER OBJECTS AGAINST STAINS, DIRT, WATER AND OIL PENETRATION

(75) Inventor: Yassin Elgarhy, Laval (CA)

(73) Assignee: Tri-Tex Co. Inc., St-Eustache, QC (CA)

( * ) Notice: Subject to any disclaimer, the term of this patent is extended or adjusted under 35 U.S.C. 154(b) by 308 days.

(21) Appl. No.: 12/591,627

(22) Filed: Nov. 25, 2009

(65) Prior Publication Data
US 2011/0123810 A1    May 26, 2011

(51) Int. Cl.
*B32B 13/12* (2006.01)
*B32B 27/28* (2006.01)

(52) U.S. Cl. ......... 428/421; 428/447; 428/540; 428/688

(58) Field of Classification Search ........................ None
See application file for complete search history.

(56) References Cited

U.S. PATENT DOCUMENTS

| | | | | |
|---|---|---|---|---|
| 5,212,016 | A * | 5/1993 | Mascia et al. | 428/422 |
| 5,688,309 | A * | 11/1997 | Shimada et al. | 106/2 |
| 5,886,089 | A * | 3/1999 | Knowlton | 524/544 |
| 6,716,944 | B2 | 4/2004 | Maekawa et al. | |
| 6,773,805 | B1 * | 8/2004 | Feiring et al. | 428/336 |
| 7,173,092 | B2 | 2/2007 | Gornowicz et al. | |
| 7,345,118 | B2 | 3/2008 | Chorvath et al. | |
| 7,479,532 | B2 | 1/2009 | Tonge | |
| 7,511,179 | B2 | 3/2009 | Araki et al. | |
| 7,547,742 | B2 | 6/2009 | Hartmann et al. | |

* cited by examiner

*Primary Examiner* — Ramsey Zacharia
(74) *Attorney, Agent, or Firm* — Norton Rose Canada LLP

(57) ABSTRACT

An aqueous composition of a non-siliceous fluorocarbon polymer forms a dry deposit derived from the non-siliceous fluorocarbon polymer on the surface of construction material; the non-siliceous fluorocarbon polymer being characterized by the presence of fluorocarbon units of up to 6 carbon atoms; this non-siliceous fluorocarbon polymer is a protecting agent imparting an excellent water and oil repellency and also protection against stains and dirt, to bricks, clay roofing, different kinds of tiles, marble, granite, slate, stucco,paving stones, unglazed ceramic, sandstones, limestone, wood and other objects; it is durable and can be processed at low temperature; the composition may also include silicone based agents and acrylics and can provide a natural, satin or wet look to the construction material surface.

9 Claims, No Drawings

PROTECTING AGENT FOR CONCRETE, MASONRY SURFACE, BRICKS, CLAY ROOFING, TILES, MARBLE, GRANITE, CONCRETE SLATE, STUCCO, PAVING STONES, UNGLAZED CERAMIC, SANDSTONE, LIMESTONE, WOOD AND OTHER OBJECTS AGAINST STAINS, DIRT, WATER AND OIL PENETRATION

FIELD OF THE INVENTION

This invention relates to a method of protecting construction materials against stains and dirt, while also providing water and oil repellency, and to compositions for use in such a method, as well as protected construction materials; the protection provided is based on a fluorine-containing polymer.

DESCRIPTION OF PRIOR ART

Existing techniques of protecting materials such as textiles and paper, for example to render them water repellent involve coating the material with hydrophobic solid materials having small surface tension to modify the surface of the material and render it water repellent, the coating materials usually are based on hydrophobic wax, acrylic polymers, vinyl type high molecular weight polymers, or silicones, these polymer coatings are water repellent but not oil repellent.

It has also been proposed to impart water and oil repellency at the same time, to material, by coating with an organic solvent solution or an aqueous dispersion of a polymer containing polyfluoro alkyl groups which contain 8 or more carbon atoms.

U.S. Pat. No. 6,716,944 describes a composition which provide water and oil repellency to paper and textile substrates, which composition is based on a copolymers of two classes in which one of the comonomers has a fluorine containing organic group of 1 to 20 carbon atoms; one of the two classes employs a comonomer which has not more than 6 carbon atoms; the other of the two classes employs a comonomer which is a fluoro ether of 1 to 20 carbon atoms but which bears a fluoro alkyl group of not more than 6 carbon atoms.

U.S. Pat. No. 7,511,179 describes fluorine-containing polymers for use in photoresist compositions providing improved dry etching resistance, wherein the fluorine-containing polymers include a structural unit derived from an ethylenic monomer of 2 or 3 carbon atoms and having at least one fluorine substituent.

SUMMARY OF THE INVENTION

It is an object of this invention to provide water and oil repellency to construction substrate materials including concrete, masonry surface, bricks, clay roofing, tiles, marble, granite, slate, stucco, paving stones, unglazed ceramic, sandstone, limestone, wood and the like.

It is a further object of this invention to provide method of rendering such construction materials durable and resistant to vapour and water.

It is a still a further object of this invention to provide an aqueous formulation for providing water, oil repellency and resistance to staining and dirt for construction materials.

It is yet another object of this invention to provide a protected construction material.

In one aspect of the invention, there is provided a method of imparting water and oil repellency and resistance to staining to a surface of a construction material, which comprises applying to the surface an aqueous composition of a non-siliceous fluorocarbon polymer to form a dry deposit derived from the non-siliceous fluorocarbon polymer on the surface; the non-siliceous fluorocarbon polymer being characterized by the presence of fluorocarbon units of up to 6 carbon atoms.

In another aspect of the invention, there is provided an aqueous composition for imparting water and oil repellency and resistance to staining to a surface of a construction material, which comprises a non-siliceous fluorocarbon polymer characterized by the presence of fluorocarbon units of up to 6 carbon atoms; in an aqueous vehicle.

In still another aspect of the invention, there is provided a protected construction material having a surface which is water and oil repellent and resistant to staining, said surface having a dry deposit derived from a non-siliceous fluorocarbon polymer characterized by the presence of fluorocarbon units of up to 6 carbon atoms.

The non-siliceous fluorocarbon polymer may be employed alone or in combination with silicone based products including siloxane, silane, or combination of these products and also other organic salts, and/or acrylic polymers. In such case the additional components such as silicones may be present in the aqueous composition with the non-siliceous fluorocarbon polymer.

Suitable silicone based products include siloxane silane, siliconate, and macro or micro silicone emulsions.

DETAILED DESCRIPTION OF THE INVENTION

The invention employs polymers which have structural fluorocarbon units based on Carbon 6 or less ie. up to 6 carbon atoms, and which impart excellent water, oil and stain repellency to construction materials at low temperature.

In particular the fluorine-containing polymers described in U.S. Pat Nos. 6,716,944 and 7,511,179 are surprisingly found to be highly suitable for treating construction materials, to produce construction materials which are water, oil and stain repellent, with the treated surfaces being highly durable to the external environment to which they are exposed, such as the extremes of weather encountered in North America and exposure as pedestrian areas. The teachings of U.S. Pat. Nos. 6,716,944 and 7,511,179 are incorporated herein by reference, in so far as they relate to such fluorine-containing polymers and their manufacture.

The fluorine-containing polymers in this invention can be applied alone or with silicone based products, organic chemicals compounds, for example urea, and/or acrylic polymers, to provide improved or other advantageous characteristics to the construction material substrates. The fluorine-containing polymers are in particular employed as aqueous dispersions or emulsions.

(i) Fluorine-containing Polymers

Non-siliceous fluorocarbon polymer herein refers to fluorine-containing polymers or copolymers that do not contain silicon.

(i) One class of fluorine-containing polymer for use in the invention comprises a fluorine-containing polymer for use in the invention comprises a copolymer consisting essentially of polymerized units of a monomer (a) being an Rf monomer wherein the melting point of fine crystals derived from the Rf groups in a homopolymer of the monomer, does not exist or is at most 50° C.; and polymerized units of a monomer (b) being a monomer having no Rf group, wherein the melting point of fine crystals derived from a homopolymer of the monomer is at least 30° C.; wherein Rf is a poly fluoroaliphatic group.

The presence or absence of fine crystals derived from Rf groups can be confirmed by observing a peak attributable to their self packing by means of a wide angle or small angle X-ray scattering. If the fine crystals are present in the polymer, usually the spacing of their characteristic packing planes is observed to be about 5 Å.

The Rf monomer means a monomer having an R group and a polymerizable unsaturated group. The Rf monomer is preferably a compound represented by the formula $(Z-Y)_nX$ wherein an Rf group Z and a polymerizable unsaturated group X are bonded to each other via a specific bivalent organic group Y. Here, Z is an Rf group having a number of carbon atoms of at most 6, or a group represented by the formula $C_mF_{2m+1}O(CF_2CF(CF_3)O)_dCF(CF_3)$— in which m is an integer of from 1 to 6, and d is an integer of from 1 to 4, n is 1 or 2, and when n is 2, two $(Z-Y)$ may be the same or different from each other. X may be: $-CR=CH_2$—COOCR=CH$_2$, $-OCOCR=CH_2$, $-OCH_2$-Ph-CR=CH$_2$ or $-OCH=CH_2$ when n is 1, and may be: $=CH(CH_2)_q$CR=CH$_2$, $=CH(CH_2)_qCOOCR=CH_2=CH(CH_2)_q$OCOCR=CH$_2$ or, $-OCH_2OCH=CHCOO-$ when n is 2; in which R is a hydrogen atom, a methyl group or a halogen atom, Ph is a phenylene group, and q is an integer from 0 to 4. Further, Y is a bivalent organic group or a single bond. The Rf group is a group having a part or all of hydrogen atoms of an alkyl group substituted by fluorine atoms, and its carbon number is preferably from 1 to 20. The Rf group is preferably a group having at least from 20 to 80% in number of hydrogen atoms of an alkyl group substituted by fluorine atoms. Further, a part or all of the remaining hydrogen atoms may be substituted by chlorine atoms. The Rf group may be of linear type or branched type. In the case of branched type, one having a short branch at the end far from the connecting bond or in the vicinity of the end, is preferred.

Among the above-mentioned preferred Rf groups, a linear Rf group represented by the formula $F(CF_2)_k$— in which k is an integer of from 1 to 20, or a group represented by the formula $C_jF_{2j+1}(CM^1M^2CM^3M^4)_i$—, in which $M^1$, $M^2$, $M^3$ and $M^4$ are each independently a hydrogen atom, a fluorine atom or a chlorine atom, and one of them is a fluorine atom, and j and i are each an integer of at least 1 and satisfy $20\geq (j+2\times i)\geq 6$, is preferred. Particularly, an Rf group having a carbon number of at most 6, or a group represented by the formula $C_mF_{2m+1}O(CF_2CF(CF_3)O)_dCF(CF_3)$— in which m is an integer of from 1 to 6, and d is an integer of from 1 to 4, is preferred.

The carbon number of the Rf group is preferably from 1 to 20, particularly preferably from 1 to 12. One having a small carbon number is preferred since fine crystals derived from the Rf groups are not likely to be formed when the homopolymer is formed, and the copolymer can form a film. The Rf group may be a linear polyfluorohydrocarbon group having at least one unsaturated group such as a carbon-carbon unsaturated double bond.

The Rf group may be a polyfluorooxaalkyl group having a part of its carbon atoms substituted by etheric oxygen atoms. Particularly, a polyfluorooxaalkyl group, more particularly, a perfluorooxaalkyl group, having at least one perfluorooxypropylene group, is preferred. The carbon number in this case is preferably from 6 to 18 including carbon atoms before substitution by oxygen atoms.

A specific Rf group may be one of the following Rf groups, but is not limited thereto: $F(CF_2)_4$—, $F(CF_2)_5$—, $F(CF_2)_6$—, $(CF_3)_2CF(CF_2)_2$—, $H(CF_2)_6$—, $HCF_2CF_2$—, $Cl(CF_2)_4$—, $F(CF_2)_4(CH_2CF_2)_3$—, $F(CF_2)_6(CH_2CF_2)_3$—, $F(CF_2)_4(CF-ClCF_2)_2$—, $CF_3CF_2C(CF_3)$—$CH(CF_3)(CF_2CF_3)$, $C_eF_{2e+1}O[CF(CF_3)CF_2O]_h$—$CF(CF_3)$—, $C_3F_7O[CF(CF_3)CF_2O]_h(CF_2)_v$— or $CF_3CF$=$CFCF_2CF$=$CF$— in which e is an integer of from 3 to 6, h is an integer of from 0 to 3, and v is an integer of from 2 to 6.

The Rf group and the polymerizable unsaturated group may be bonded by a single bond or via a bivalent organic group. As the bivalent organic group, a group containing an alkylene group is preferred. The alkylene group may be linear or one having a branch. Further, in the bivalent organic group, e.g. —O—, —NH—, —CO—, —SO$_2$— or —CD$^1$=CD$^2$— in which $D^1$ and $D^2$ each independently represents a hydrogen atom or a methyl group may. As the bivalent organic group, an alkylene group is preferred.

As Y, a bivalent organic group represented by the formula —$R^M$-Q-$R^N$— in which $R^M$ and $R^N$ each independently represents a single bond or a saturated or unsaturated hydrocarbon group having a carbon number of from 1 to 22 which may contain at least one oxygen atom, and Q represents a single bond, —OCONH—, —CONH—, —SO$_2$NH— or —NH-CONH— is preferred.

As Y, —CH$_2$—, —CH$_2$CH$_2$—, —(CH$_2$)$_{11}$—, —CH$_2$CH$_2$CH(CH$_3$)—, —(CH$_2$CHR$^2$O)$_w$CH$_2$CH$_2$— in which w is an integer of from 1 to 10, and $R^2$ represents a hydrogen atom or a methyl group, —C$_2$H$_4$OCONHC$_2$H$_4$—, —C$_2$H$_4$OCOOC$_2$H$_4$—, —COOC$_2$H$_4$— or —CH=CHCH$_2$— may be preferably mentioned.

As X, an ethylenic polymerizable unsaturated group, namely, e.g. a residue of an olefin, a residue of a vinyl ether, a residue of a vinyl ester, a residue of a (meth)acrylate, a residue of a maleic acid ester or a residue of a fumaric acid ester, is preferred. Here, the residue of an olefin means a group represented by:
—CR=CH$_2$,
the residue of a vinyl ester means a group represented by:
—COOCR=CH$_2$,
the residue of a vinyl ether means a group represented by:
—OCR=CH$_2$,
the residue of a (meth)acrylate means a group represented by:
—OCOCR=CH$_2$, and the residue of a maleic acid or fumaric acid ester means a group represented by:
—OCOCH=CHCOO—.

In addition to these, may be mentioned:
—OCH$_2$—Ph—CR=CH$_2$ and —OCH$_2$=CH$_2$,
in which Ph represents a phenylene group. In the above R is preferably a hydrogen atom, a halogen atom (a fluorine atom, a chlorine atom, etc.) or a short-chain alkyl group having a carbon number of from 1 to 3, particularly a methyl group, in order not to hinder polymerization. In consideration of the polymerizability to form a copolymer, X is preferably a residue of a (meth)acrylate, or a residue of maleic acid or fumaric acid ester, and from the viewpoint of e.g. the solubility or easiness of emulsion polymerization, the residue of a (meth) acrylate is particularly preferred.

As the Rf monomer, particularly a (meth)acrylate having an Rf group is preferred. As such an Rf monomer, various monomers such as the following monomer (a) may be used. As such monomers, known monomers may be used. As the monomer (a) employed in the present invention, a (meth) acrylate is particularly preferred as mentioned above from the viewpoint of e.g. the polymerizability with other monomers, flexibility of the film to be formed, adhesion to the substrate, solubility and easiness of emulsion polymerization.

The Rf group preferably has a carbon number of at most 6. And, it is most preferably a linear Rf group having a carbon number of from 4 to 6.

When Y is —$CH_2CH_2CH(CH_3)$— or —$CH=CHCH_2$— and X is a (meth)acrylate, the carbon number of the Rf group is preferably from 1 to 10, particularly preferably from 4 to 8. When the Rf group is a polyfluoropolyether group containing an oxygen, and X is a (meth)acrylate, the carbon number of the Rf group is preferably from 4 to 18.

As the monomer (b) of the present invention, a (meth) acrylate, a vinyl ether or a vinyl ester may preferably be mentioned. The monomer (b) may contain a small number of isolated fluorine atoms which are usually not regarded as Rf groups. Further, as an organic group contained in the monomer (b), a long-chain hydrocarbon group wherein the melting point of fine crystals is at least 30° C., is preferred.

As the monomer (b) having a long-chain hydrocarbon group, a monomer having a linear hydrocarbon group having a carbon number of at least 14, particularly a monomer having a linear saturated alkyl group having a carbon number of from 16 to 24, is preferred. As the monomer (b), a (meth)acrylate containing a saturated hydrocarbon group having a carbon number of at least 15, is particularly preferred. Further, a vinyl ester containing a saturated hydrocarbon group having a carbon number of at least 15, is also preferred.

The molar ratio of polymerized units of monomer (a)/polymerized units of monomer (b) in the copolymer is preferably from 0.1/1 to 9/1, more preferably from 0.2/1 to 5/1, particularly preferably from 0.2/1 to 1.5/1. The composition in this range is excellent in the water and oil repellency and in the flexibility of the film, such being preferred. Further, the copolymer may contain a monomer (also referred to as another monomer) other than the monomer (a) and the monomer (b), for the purpose of improving physical properties other than the water and oil repellency, such as the adhesion to a substrate, the bonding property, and the durability against abrasion. Another monomer may, for example, be ethylene, vinylidene chloride, vinyl chloride, vinylidene fluoride, vinyl acetate, styrene, .alpha.-methylstyrene, p-methylstyrene, glycidyl(meth)acrylate, (meth)acrylamide, N,N-dimethy (meth)acrylamide, diacetone(meth)acrylamide, methyloldiacetone(meth)acrylamide, N-methylol(meth)acrylamide, vinyl alkyl ether, an alkyl vinyl ether halide, a vinyl alkyl ketone, butadiene, isopropylene, chloroprene, aziridinylethyl (meth)acrylate, benzyl(meth)acrylate, aziridinyl(meth)acrylate, a polyoxyalkylene(meth)acrylate, a methylpolyoxyalkylene(meth)acrylate, a 2-ethylhexylplyoxyalkylene(meth) acrylate, a polyoxyalkylene di(meth)acrylate, a (meth) acrylate having polysiloxane, triallyl cyanurate, allylglycidyl ether, allyl acetate, N-vinylcarbazole, maleimide, N-methylmaleimide, (2-dimethylamino)ethyl(meth)acrylate, a (meth) acrylate having an alkyl group having a carbon number of from 8 to 20, a cycloalkyl(meth)acrylate, hydroxyethyl (meth)acrylate, glycerol(meth)acrylate, a (meth)acrylate having a silicone in its side chain, a (meth)acrylate having an urethane bond, an alkylenedi(meth)acrylate or polyoxyalkylene di(meth)acrylate.

Particularly, vinyl chloride, a hydroxyethyl(meth)acrylate having a reactive group such as a hydroxyl group in its molecule, a polyoxyalkylene(meth)acrylate, a methylpolyoxyalkylene(meth)acrylate, a glycidyl(meth)acrylate, a bifunctional polyoxyethylene di(meth)acrylate, ethyleneglycoldi (meth)acrylate or a blocked isocyanate ethyl(meth)acrylate, is preferred with a view to improving the adhesion to the construction material surface of the composition of the invention.

In the composition of the present invention, the method of preparing the copolymer to be the active component, is not particularly limited. For example, a common polymerization method such as a solution polymerization method using an organic solvent, a dispersion polymerization method using water as a dispersion medium and containing a non-ionic surfactant and/or a cationic surfactant, or an emulsion polymerization method, may be employed. The obtained solution, dispersion or emulsion of the copolymer may be used as it is, or may be used as diluted. Otherwise, the copolymer may be isolated, and then, dissolved, dispersed or emulsified in a solvent, dispersion medium or emulsion medium.

(ii) A second class of fluorine-containing polymer for use in the invention is a fluorine-containing polymer having an aliphatic monocyclic structure in the polymer trunk chain, which has a number average molecular weight of from 500 to 1,000,000 and is represented by the formula:

(Ma): -(M1)-(M2a)-(N)—            (Ma)

in which the structural unit M1 is a structural unit derived from an ethylenic monomer having 2 or 3 carbon atoms and at least one fluorine atom, the structural unit M2a is at least one structural unit which introduces an aliphatic monocyclic structure in the polymer trunk chain and is represented by the formula:

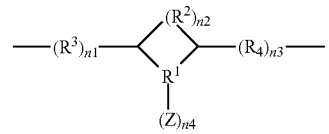

wherein $R^1$ is at least one hydrocarbon group selected from the group consisting of a divalent hydrocarbon group which has 1 to 8 carbon atoms and constitutes a ring (which may be further substituted with a hydrocarbon group or a fluorine-containing alkyl group) and a divalent hydrocarbon group having ether bond which has the sum of carbon atoms and oxygen atoms of 2 to 8 and constitutes a ring (which may be further substituted with a hydrocarbon group or a fluorine-containing alkyl group); $R^2$ is an alkylene group which has 1 to 3 carbon atoms and constitutes a ring; $R^3$ and $R^4$ are the same or different and each is a divalent alkylene group having 1 or 2 carbon atoms; n1, n2 and n3 are the same or different and each is 0 or 1, the structural unit N is a structural unit derived from a monomer copolymerizable with the monomers to introduce the structural units M1 and M2a; $(Z)_{n4}$ is H or each Z is the same or different and each is:

—$(R^5)_{n5}Z^1$ wherein $Z^1$ is at least one functional group selected from the group consisting of OH group, COOH group, a derivative of carboxylic acid group and a functional group protected by a protective group which can convert the functional group to OH group by reaction with an acid; $R^5$ is a divalent organic group; n5 is 0 or 1; n4 is an integer of from 1 to 3, and wherein the structural units M1, M2a and N are contained in amounts of from 1 to 99% by mole, from 1 to 99% by mole and from 0 to 98% by mole, respectively. An especially preferred fluorine-containing polymer of the invention is a fluoroalkyl acrylate copolymer derived from a first monomer having a polyfluoroalkyl group, wherein the melting point of fine crystals derived from the polyfluoroalkyl groups in a homopolymer of the monomer, does not exist or is at most 50° C.; and a second monomer having an organic group other than a polyfluoroalkyl group and wherein the melting point of fine crystal derived from the organic groups in a homopolymer of the second monomer, is at least 30° C.

Examples of specific fluorine-containing polymers which can be used to achieve the purpose of this invention include, but not limited to TG8731 and TG 8111 from Daikin Industries; and AGE-060 from Asahi Glass.

The aqueous composition of the fluorine-containing polymer is suitably at a pH below 10, preferably below 7. The composition will suitably contain the fluorine-containing polymer in an amount of at least 0.1%, by weight, more especially 0.1 to 10%, typically 2 to 5%, based on the weight of the aqueous composition.

The fluorine-containing polymers once they are applied on a construction material substrate surface, cross link and bond or adhere to the substrate surface and have good durability at low temperature without any need for heating.

The fluorine-containing polymers can be applied outdoors or indoors without any problem, and can be applied at ambient temperatures and dry at ambient ambient temperatures.

In particular the aqueous composition of the invention can be applied by wiping-brushing-rolling-immersing or spraying method, and cured at room temperature.

This aqueous composition provides a protecting agent which is durable, and the composition can be processed at low temperature, and has the advantage of being a water based product, not containing organic solvents and it is not considered a hazardous or dangerous product to use.

As the aqueous composition dries the fluorine-containing polymer adheres to the construction material surface as a deposit of very fine particles, typically crystals. This deposit is not a sealer and will not yellow nor leave a surface film, moreover it is UV stable and vapour permeable thus increasing life of the construction material, and reduces spalling, cracking and freeze/thaw damage.

(b) Silicones

When a silicone based product is employed in the aqueous composition of the invention in combination with the fluorine-containing polymer; the composition may be formulated to produce a wet look or a satin look or a natural look, on the treated construction material surface.

A wet look is achieved by an aqueous composition of the invention in which the silicone is present as a micro silicone emulsion. A satin look is achieved when the silicone is present as a macro silicone emulsion. Also a combination of micro and macro emulsions can be used to obtain a desired look.

A micro emulsion herein is one in which the silicone is present as droplets having an average particle size of up to 1 micron; whereas a macro emulsion herein is one in which the silicone is present as droplets having an average particle size of more than 1 micron, more especially 1 to 10,000 microns, typically 50 to 120 microns, preferably about 100 microns.

The silicone materials penetrate the construction material surface to enhance water repellency.

The products based on silicone which can be applied with the fluorine-containing polymers include but are not limited to silanes, siloxane, and silicone emulsions which emulsions may be microemulsions or macroemulsions, siliconates and combination therefore.

Examples of commercially available silicone products that can be used in this invention are but not limited to:

| 1) Silane | Dow Corning IE 6694 |
| | Dow Corning Z-9034 |
| 2) Siloxane | Dow Corning Z-6184 |
| | Dow Corning Z-60 |
| 3) Silane/Siloxane | Dow Corning 520 |
| | Dow Corning 6694 |
| | Dow Corning IE-6683 |
| | Dow Corning Z-9034 |
| 4) Siliconate | Dow Corning 772 |
| | Dow Corning 777 |

Examples of other commercially available silicones which can be used in this invention are:

| K C89 | from Shin ETSU |
| K P 359 | from Shin ETSU |
| KP 390 | from Shin ETSU |
| Polon MF 40 | from Shin ETSU |
| Polon A | from Shin ETSU |
| K F413 | from Shin ETSU |

5) Silicone macro or micro emulsions which are used in this invention may be based on modified silicone fluids which are reacted with themselves, or with other silicone polymers or coupling agents, then emulsified to produce micro or macro emulsions.

c) Acrylics

Acrylics may also be employed in combination with the fluorine-containing polymer and may be employed in the aqueous composition with the fluorine-containing polymer to enhance the properties of the composition. In particular the presence of an acrylic increases the resistance to absorption of water.

The acrylics form a film or coating on the construction material surface and in this respect function as sealants on the surface.

Examples of acrylic polymers that can be used in this invention are acrylic copolymers based on two or more of the following monomers; ethyl acrylate, methyl methacrylate, methacrylic acid, acrylic acid, butyl acrylate, ethyl hexyl acrylate—ethyl hexy/methacrylate, with TG from 0 to 60° C. (32 to 140° F.) preferably from 20 to 40° C. (68 to 104° F.).

d) Construction Materials

Construction materials as contemplated by this invention comprise materials employed in construction of structures such as buildings and bridges and paved surfaces and which have surfaces which are exposed to water, oil and stains and dirt in the environment and as a result of human and animal passage. Typical construction materials include concrete, masonry surface, bricks, clay roofing, tiles, marble, granite, concrete slate, stucco, paving stones, unglazed ceramic, sandstone, limestone and wood.

EXAMPLES

Test Methods:
Water repellency drop test:

| Rating | Composition |
| --- | --- |
| 1 | 98 water |
| | 2 Isopropy alcohol (IPA) |
| 2 | 95 water |
| | 5 IPA |
| 3 | 90 water |
| | 10 IPA |
| 4 | 80 water |
| | 20 IPA |

-continued

| Rating | Composition |
|---|---|
| 5 | 70 water |
|   | 30 IPA |
| 6 | 60 water |
|   | 40 IPA |

In the evaluation 6 is best 1 is mediocre.
In this test the drop should stay on surface for 10 second before rating is taken.
Oil Repellency test is evaluated as follows:

| Rating | Composition |
|---|---|
| 1 | Kaydol (trademark for Mineral Oil) |
| 2 | 65/35 Kaydol/N-Hexadecane |
| 3 | N-hexadecane |
| 4 | Tetradecane |
| 5 | Dodecane |
| 6 | Decane |

In the evaluation 6 is best 1 is mediocre.
In this test the drop should stay on surface for 30 seconds before rating is taken.
Absorbancy test:
ASTM Designation C-272-01
In this test a small piece of the core material is conditioned under various moisture conditions and the amount of moisture absorbed is measured by the weight increase in the specimen.
Five (5) specimens are tested for each example.
Examples of products used to evaluate the performance:

| | |
|---|---|
| Example #1 | 80 parts water |
|  | 20 parts Carbon 6 Fluorochemical 20% solid content |
| Example #2 | 16 parts Carbon 6 Fluorochemical (20% solid) |
|  | 4 parts Silane/Siloxane (40% solid) |
|  | 80 parts Water |
| Example #3 | 80 parts water |
|  | 16 parts Carbon 6 Fluorochemical (20% solid) |
|  | 4 parts Silane (60% solid) |
| Example #4 | 80 parts water |
|  | 16 parts Carbon 6 Fluorocarbon (20% solid) |
|  | 4 parts Siloxane |
| Example #5 | Water |
|  | 16 parts Carbon 6 Fluorochemical (20% solid) |
|  | 10 parts Macro emulsion (40% solid) |
| Example #6 | 64 parts water |
|  | 16 parts Carbon 6 Fluorochemical (20% solid) |
|  | 20 parts Micro emulsion (20% solid) |
| Example #7 | 74 parts water |
|  | 16 parts Carbon 6 Fluorochemical (20% solid) |
|  | 10 parts Acrylic copolymer (50% solid) |
| Example #8 | 60 parts water |
|  | 16 parts Carbon 6 Fluorochemical (20% solid) |
|  | 4 parts Macro emulsion (40% solid) |
|  | 20 parts Acrylic copolymer |
| Example #9 | 68 parts water |
|  | 20 parts Carbon 6 Fluorochemical (20% solid) |
|  | 12 parts Urea |
| Example #10 | 70 parts water |
|  | 20 parts Acrylic polymer (50% solid) |
|  | 10 parts Silane/Slioxane (40% solid) |

In the above Carbon 6 Fluorochemical refers to a preferred fluorine-containing copolymer of the invention, namely the fluoroalkyl acrylate copolymer described hereinbefore.
Test procedure:
In this evaluation surface dirt on the substrate should be remove using standard maintenance procedures. The substrate should be allowed to dry completely before application. The formulations of the above Examples were applied evenly over a substrate by a rolling method, and allowed to dry for at least 12 hours, the formulations were applied at a temperature above 0° C. (32° F.).
Test Results:

| Example | Water Repellency | Oil Repellency |
|---|---|---|
| 1 | 6 | 6 |
| 2 | 6 | 4 |
| 3 | 6 | 4 |
| 4 | 6 | 4 |
| 5 | 6 | 3 |
| 6 | 6 | 3 |
| 7 | 6 | 6 |
| 8 | 6 | 5 |
| 9 | 6 | 6 |
| 10 | 6 | 0 |

Absorbency Test:
In this test 5 samples were selected for testing, they are samples of example #1, #3, #6, and #8.
In these tests, 5 specimens are tested for each example. Each sample was weighed then immersed in water for 7 days, then removed from the water and the excess of water was removed, then the moisture absorbed was measured by the weight increase in each specimen, then the average of the weight increase of the 5 samples was taken.
In the evaluation, the reference is an untreated specimen immersed in water in the same way as the treated samples, and the weight was taken before and after immersing this sample in water.
Test Results:

|  | Reference | Example #1 | Example #3 | Example #6 | Example #8 |
|---|---|---|---|---|---|
| Initial mass | 196.15 | 209.62 | 212.1 | 213.43 | 217.73 |
| Final mass | 218.85 | 231.24 | 233.78 | 236.34 | 237.55 |
| Absorbed mass | 22.7 | 21.62 | 22.68 | 22.91 | 19.82 |
| Absorbed % | 11.57 | 10.31 | 10.22 | 10.73 | 9.10 |

Absorbency test results of example #9:
In this test 3 specimens were tested for 7 days.

|  | Reference | Example #9 Sample #1 | Example #9 Sample #2 | Example #9 Sample #3 |
|---|---|---|---|---|
| Initial mass | 228.56 | 232.83 | 227.87 | 223.93 |
| Final Mass | 253.52 | 256.07 | 250.40 | 246.23 |
| Absorbed mass | 24.96 | 23.24 | 22.53 | 22.23 |
| Absorbed % | 10.92 | 9.98 | 9.89 | 9.95 |

Conclusions:
From the test results of the previous Examples it can be seen that the best way to obtain water repellency stain repellency and oil repellency is by using formulations of this invention. When these products are applied they provide natural look to the substrate and they have no adverse effect and they are not considered as sealers.

Also if satin look or wet look is needed then a micro and/or macro silicone emulsion can be added to the formulation.

If the minimum absorbency is needed then an acrylic polymer may be added; when this combination is applied, it is considered a sealer.

The invention claimed is:

1. A protected construction material having a surface which is water and oil repellent and resistant to staining, said surface having a dry deposit comprising crystal particles derived from a non-siliceous fluorocarbon polymer characterized by the presence of fluorocarbon units of up to 6 carbon atoms, wherein said non-siliceous fluorocarbon polymer is a fluorine-containing polymer having an aliphatic monocyclic structure in the polymer trunk chain, which has a number average molecular weight of from 500 to 1,000,000 and is represented by the formula:

(Ma): -(M1)-(M2a)-(N)— (Ma)

in which the structural unit M1 is a structural unit derived from an ethylenic monomer having 2 or 3 carbon atoms and at least one fluorine atom, the structural unit M2a is at least one structural unit which introduces an aliphatic monocyclic structure in the polymer trunk chain and is represented by the formula:

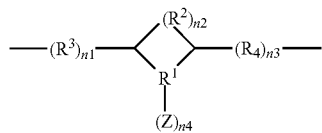

wherein $R^1$ is at least one hydrocarbon group selected from the group consisting of a divalent hydrocarbon group which has 1 to 8 carbon atoms and constitutes a ring (which may be further substituted with a hydrocarbon group or a fluorine-containing alkyl group) and a divalent hydrocarbon group having ether bond which has the sum of carbon atoms and oxygen atoms of 2 to 8 and constitutes a ring (which may be further substituted with a hydrocarbon group or a fluorine-containing alkyl group); $R^2$ is an alkylene group which has 1 to 3 carbon atoms and constitutes a ring; $R^3$ and $R^4$ are the same or different and each is a divalent alkylene group having 1 or 2 carbon atoms; n1, n2 and n3 are the same or different and each is 0 or 1, the structural unit N is a structural unit derived from a monomer copolymerizable with the monomers to introduce the structural units M1 and M2a; $(Z)_{n4}$ is H or each Z is the same or different and each is:

—$(R^5)_{n5}Z^1$ wherein $Z^1$ is at least one functional group selected from the group consisting of OH group, COOH group, a derivative of carboxylic acid group and a functional group protected by a protective group which can convert the functional group to OH group by reaction with an acid; $R^5$ is a divalent organic group; n5 is 0 or 1; n4 is an integer of from 1 to 3, and wherein the structural units M1, M2a and N are contained in amounts of from 1 to 99% by mole, from 1 to 99% by mole and from 0 to 98% by mole, respectively.

2. The protected construction material of claim 1, wherein said construction material is selected from concrete, masonry surfaces, bricks, clay roofing, tiles, marble, granite, concrete slate, stucco, paving stones, unglazed ceramic, sandstone, limestone or wood.

3. The protected construction material of claim 1, wherein said dry deposit further comprises one or more of: silicone from a micro silicone emulsion and silicone from a macro silicone emulsion.

4. The protected construction material of claim 1, wherein said dry deposit further comprises silicone from a micro silicone emulsion.

5. The protected construction material of claim 4, wherein said construction material is selected from concrete, masonry surfaces, bricks, clay roofing, tiles, marble, granite, concrete slate, stucco, paving stones, unglazed ceramic, sandstone, limestone or wood.

6. The protected construction material of claim 1, wherein said dry deposit further comprises one or more of: silicone from a micro silicone emulsion, silicone from a macro silicone emulsion, silane, siloxane, siliconates, acrylic polymer and urea.

7. The protected construction material of claim 6, wherein said acrylic polymer comprises at least one or more of the following monomers, ethyl acrylate, methyl methacrylate, ethyl hexylacrylate, ethyl hexyl methacrylate, butyl acrylate, methacrylic acid, and ethyl methacrylate.

8. The protected construction material of claim 1, wherein said dry deposit further comprises silicone from a macro silicone-emulsion.

9. The protected construction material of claim 8, wherein said construction material is selected from concrete, masonry surfaces, bricks, clay roofing, tiles, marble, granite, concrete slate, stucco, paving stones, unglazed ceramic, sandstone, limestone or wood.

* * * * *